US00RE40699E

(19) United States
(12) Reissued Patent
Yoshida

(10) Patent Number: US RE40,699 E
(45) Date of Reissued Patent: Apr. 14, 2009

(54) FACSIMILE APPARATUS CONTROLLING COMMUNICATION IN ACCORDANCE WITH REGISTERED EXECUTION OF THE ERROR CORRECTION MODE

(75) Inventor: Takehiro Yoshida, Shibuya-ku (JP)

(73) Assignee: Canon Kabushiki Kaisha, Tokyo (JP)

(21) Appl. No.: 11/702,231

(22) Filed: Feb. 5, 2007

Related U.S. Patent Documents

Reissue of:
(64) Patent No.: 6,046,825
Issued: Apr. 4, 2000
Appl. No.: 08/625,101
Filed: May 13, 1996

(30) Foreign Application Priority Data

May 12, 1995 (JP) ..... 7-138817

(51) Int. Cl.
*H04N 1/32* (2006.01)

(52) U.S. Cl. ..... 358/434; 358/435; 358/436; 358/440

(58) Field of Classification Search ..... 358/434–440, 358/442, 500, 412; 379/93.08, 100.17; 714/751; 370/466, 467
See application file for complete search history.

(56) References Cited

U.S. PATENT DOCUMENTS

| | | | | | |
|---|---|---|---|---|---|
| 4,814,894 | A | | 3/1989 | Yoshida | |
| 5,159,465 | A | | 10/1992 | Maemura et al. | 358/434 |
| 5,303,066 | A | | 4/1994 | Kawaguchi | 358/434 |
| 5,307,179 | A | | 4/1994 | Yoshida | |
| 5,438,427 | A | | 8/1995 | Yoshida | 358/439 |
| 5,488,483 | A | | 1/1996 | Murayama | 358/500 |
| 5,548,781 | A | * | 8/1996 | Huang | 358/442 |
| 5,583,658 | A | | 12/1996 | Takezawa et al. | 358/407 |
| 5,661,568 | A | | 8/1997 | Ueno | 358/440 |
| 5,696,598 | A | | 12/1997 | Yoshida et al. | 358/434 |
| 5,721,731 | A | | 2/1998 | Yoshida | 370/296 |
| 5,726,765 | A | | 3/1998 | Yoshida et al. | 358/412 |
| 5,815,289 | A | | 9/1998 | Yoshida et al. | 358/468 |
| 6,122,071 | A | | 9/2000 | Yoshida | 358/434 |
| 6,463,132 | B1 | | 10/2002 | Yoshida et al. | 379/93.09 |
| 7,155,538 | B1 | * | 12/2006 | Rossello et al. | 370/465 |
| 2003/0090741 | A1 | * | 5/2003 | Yoshida | 358/434 |

* cited by examiner

*Primary Examiner*—Kimberly A. Williams
(74) *Attorney, Agent, or Firm*—Fitzpatrick, Cella, Harper & Scinto

(57) ABSTRACT

A facsimile apparatus fully effectively utilizes a specific communication function in accordance with a transmission speed. A communication circuit controls the determination of a communication mode to determine a communication mode with a destination station and controls a reception operation and a transmission operation. The control of the determination of the communication mode includes a first control, a second control, a third control and a fourth control. In the first control, a communication mode with the destination station is determined based on registered information in a transmission speed dependent ECM registration circuit.

7 Claims, 10 Drawing Sheets

FACSIMILE APPARATUS CONTROLLING COMMUNICATION IN ACCORDANCE WITH REGISTERED EXECUTION OF THE ERROR CORRECTION MODE

Matter enclosed in heavy brackets [ ] appears in the original patent but forms no part of this reissue specification; matter printed in italics indicates the additions made by reissue.

*This application is a reissue of U.S. Pat. No. 6,046,825, which issued from application Ser. No. 08/652,101 filed May 13, 1996.*

BACKGROUND OF THE INVENTION

1. Field of the Invention

The present invention relates to a facsimile apparatus having a specific communication function added.

2. Related Background Art

Usually, in a facsimile apparatus having an error correction mode (hereinafter referred to as an ECM) as a specific communication function, means for selecting communication having the ECM added thereto (hereinafter referred to as ECM communication) or ECM communication inhibition is provided. The error correction mode is one to correct dropout of data which occurs depending on a communication status, and when an error occurs, a correction process for error data is conducted between transmission and reception.

When the ECM communication is selected, the ECM communication is conducted for respective transmission speeds. On the other hand, when the ECM communication inhibition is selected, the ECM communication is not conducted for the respective transmission speeds (or speeds) and normal communication without ECM added is conducted.

Usually, in communication at a high transmission speed, a probability of occurrence of communication error is high and dropout of a large amount of image data may occur due to the communication error and the ECM functions effectively for the communication at the high transmission speed. On the other hand, in communication at a low transmission speed, a probability of occurrence of transmission error is low and the ECM is not frequently utilized effectively in the communication at the low transmission speed.

However, as described above, when the ECM communication is selected, the ECM communication is conducted for the respective transmission speeds and when the ECM communication inhibition is selected, the normal communication without the ECM added is conducted for the respective transmission speeds. Thus, it is not possible to fully effectively utilize the ECM depending on the transmission speed.

SUMMARY OF THE INVENTION

It is an object of the present invention to provide a facsimile apparatus which attains fully effective utilization of the specific communication function depending on the transmission speed.

DETAILED DESCRIPTION OF THE PREFERRED EMBODIMENTS

The preferred embodiments of the present invention are now explained in detail with reference to the accompanying drawings.

[First Embodiment]

Figure 1:
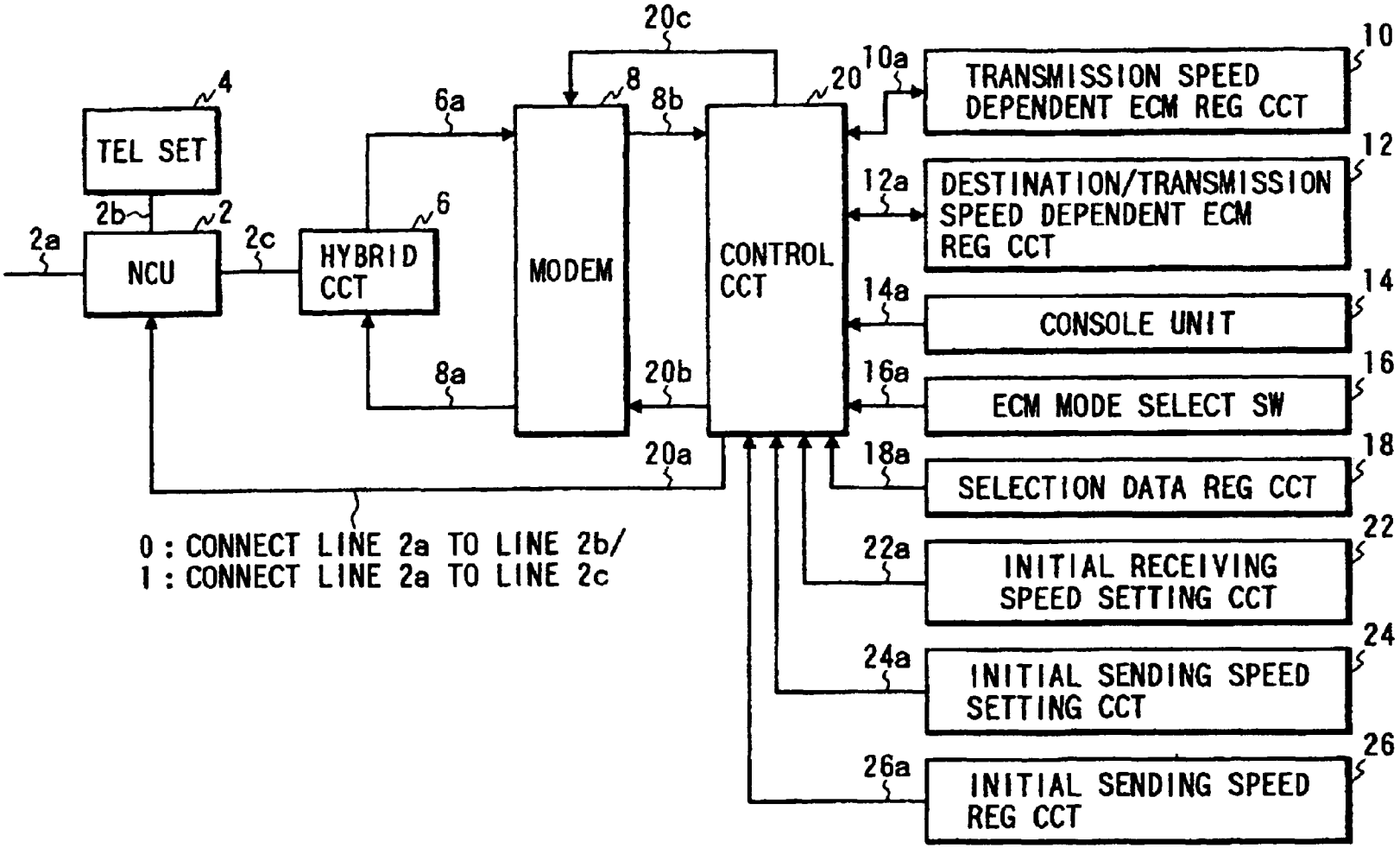
FIG. 1 shows a block diagram of a configuration of a first embodiment of a facsimile apparatus of the present invention.

FIG. 1 shows a block diagram of a configuration of a first embodiment of the facsimile apparatus of the present invention.

As shown in FIG. 1, the facsimile apparatus is provided with a network control unit (hereinafter referred to as an NCU) 2 connected to a telephone line 2a.

The NCU 2 conducts the control of connection of a telephone switching network such as the connection of a telephone network to a line terminal for use in data communication and switching to a data communication path and selectively switches the connection between the telephone line 2a and a telephone set 4 and the connection between the telephone line 2a and a hybrid circuit 6. The NCU 2 and the telephone set 4 are connected through a signal line 2b and the NCU 2 and the hybrid circuit 6 are connected through a signal line 2c. The switching operation of the NCU 2 is controlled by a control circuit 20 to be described later. When a control signal supplied from the control circuit 20 through a signal line 20a is '0', the telephone line 2a and the telephone set 4 are connected. On the other hand, when the control signal is '1', the telephone line 2a and the hybrid circuit 6 are connected. In a normal condition, the connection of the telephone line 2a and the telephone set 4 is selected.

The hybrid circuit 6 separates a transmission signal from a transmission unit to be transmitted through the telephone line 2a from a received signal to a reception unit received through the telephone line 2a.

In the transmission unit, document sheet information is read by a read circuit (not shown), the read data is coded by the control circuit 20 and the coded data is outputted to a modem 8 through a signal line 20b.

The modem 8 modulates the coded data supplied from the control circuit via the signal line 20b to generate a modulated signal and also demodulates the received signal taken from the hybrid circuit 6 via a signal line 6a to generate demodulated data. The modulation and demodulation processes are conducted in accordance with the ITU-T Recommendations V.21, V.27ter, V.29, V.17, V.8 and V.34. The contents of the modulation and demodulation processes by the modem 8 are instructed by the signal supplied from the control circuit 20 through a signal line 20c and the transmission mode is determined by the instructed modulation and demodulation processes. The signals supplied from the control circuit 20 to the modem 8 through the signal line 20c are those for specifying the transmission mode, the reception mode and the transmission speeds.

The modulated signal generated by the modem 8 is outputted to the hybrid circuit 6 through a signal line 8a and the hybrid circuit 8 sends the modulated signal to the telephone line 2a as a transmission signal through the NCU 2.

On the other hand, in the reception unit, a signal received from a sending station via the NCU 2 is outputted from the hybrid circuit 6 to the modem 8 via the signal line 6a. As described above, the modem 8 demodulates the received signal taken from the signal line 6a to generate the demodulated data. The demodulated data generated by the modem 8 is supplied to the control circuit 20 via a signal line 8b. The control circuit 20 decodes the demodulated data and the decoded data is supplied to a record circuit (not shown).

The control circuit 20 conducts the communication mode determination control to determine the communication mode with the sending or destination station as well as the reception operation and the transmission operation.

The communication mode determination control includes a first control, a second control, a third control and a fourth control.

In the first control, the communication mode with the sending or destination station is determined in accordance with registered information in a transmission speed dependent ECM registration circuit 10.

In the second control, an initial transmission speed and an initial reception speed are set by an initial transmission speed setting circuit 24 and an initial reception speed setting circuit 22, respectively, and the communication mode with the sending or destination station is determined in accordance with the set speeds and the registered information in the transmission speed dependent ECM registration circuit 10.

In the third control, one of the three modes, a mode to determine whether the ECM communication is to be conducted for respective permitted transmission speeds in accordance with the registered information in the transmission speed dependent ECM registration circuit 10, a mode to conduct the ECM communication for the respective permitted transmission speeds and a mode to conduct the normal communication without the ECM added for the respective permitted transmission speeds, is selected as the communication mode by an ECM mode selection switch 16.

In the fourth control, one of the three modes, a mode to determine whether the ECM communication is to be conducted for the respective permitted transmission speeds in accordance with the initial transmission speed registered for each destination station in the initial transmission speed registration circuit 26 and the registered information in a destination/transmission speed dependent ECM registration circuit 12, a mode to conduct the ECM communication for the respective permitted transmission speeds and a mode to conduct the normal communication without the ECM added for the respective permitted transmission speeds, is selected as the communication mode by a selection information registration circuit (or information selection circuit) 18.

The registered information of the transmission speed dependent ECM registration circuit 10 comprises information indicating the execution or non-execution of the ECM in association with the respective permitted transmission speeds and the information is registered through a signal line 10a. The registered information may, for example, comprise information indicating the execution of the ECM for the transmission speeds of 14.4 Kb/s and 12 Kb/s and information inhibiting the execution of the ECM for the transmission speeds of 9.6 Kb/s, 7.2 Kb/s, 4.8 Kb/s and 2.4 Kb/s. The information is applied to the initial reception speed and the transmission speed and the reception is stated at the speed of 14.4 Kb/s and when the presence of the ECM reception function is declared by the first DIS, the ECM communication is conducted even after the fall-back of the transmission speed to 9600 b/s by the line condition.

The transmission speed dependent ECM registration circuit 10 cooperates with the selection switch 16 to conduct the above control. The information selected by the selection switch 16 is supplied to the control circuit 20 via a signal line 16a.

The registered information in the destination/transmission speed ECM registration circuit 12 comprises information indicating the execution or non-execution of the ECM in association with the permitted transmission speeds for each destination and the information is registered through the signal line 12a. The registered information may, for example, comprise information indication the execution of the ECM for the transmission speeds of 14.4 Kb/s, 12 Kb/s, 9.6 Kb/s, 7.2 Kb/s, 4.8 Kb/s and 2.4 Kb/s when the destination station is within Japan. When the destination station is overseas, because of possibility of poor line condition, it is determined that the communication at the transmission speeds of 14.4 Kb/s and 12 Kb/s is allowed when a check result indicates a good line condition and the ECM communication is conducted at those speeds. On the other hand, if the check result indicates a bad line condition, it is determined that the communication is permitted at the transmission speeds of 9.6 Kb/s or below and the normal communication without the ECM added is conducted to prevent the extension of the communication time due to the data retransmission by the ECM communication although the deterioration of the image quality of certain degree should be permitted. However, since the low transmission speed is set, a possibility of occurrence of the communication error is low. The selection of the information addressed to the domestic destination station is conducted by a one-touch button A and the selection of the information to the overseas destination station is conducted by a one-touch button B.

The destination/transmission speed dependent ECM registration circuit 12 cooperates with the information selection circuit 18 to conduct the above control. One of a mode to conduct the ECM communication for the respective permitted transmission speeds in accordance with the initial transmission speeds registered in the initial transmission speed registration circuit 26 for the respective destination stations and the registered information in the destination/transmission speed dependent ECM circuit 12, a mode to conduct the ECM communication for the respective permitted transmission speeds and a mode to conduct the normal communication without the ECM added for the respective permitted transmission speeds is registered in the information selection circuit 18, and the registered information is supplied to the control circuit 20 through a signal line 18a.

The initial reception speed setting circuit 22 comprises a circuit to set one of the transmission speeds of 14.4 Kb/s, 12 Kb/s, 9.6 Kb/s, 7.2 Kb/s, 4.8 Kb/s and 2.4 Kb/s as the initial reception speed, and the set initial reception speed is outputted to the control circuit 20 through a signal line 22a.

The initial transmission speed setting circuit 24 comprises a circuit to set one of the transmission speeds of 14.4 Kb/s, 12 Kb/s, 9.6 Kb/s, 7.2 Kb/s, 4.8 Kb/s and 2.4 Kb/s as the initial transmission speed, and the set initial transmission speed is outputted to the control circuit 20 through a signal line 24a.

The initial transmission speed registration circuit 26 comprises a circuit to set the initial transmission speed in association with each destination station and comprises a circuit, for each destination, to set one of the transmission speeds of 14.4 Kb/s, 12 Kb/s, 9.6 Kb/s, 7.2 Kb/s, 4.8 Kb/s and 2.4 Kb/s as the initial transmission speed, and the set initial transmission speed is outputted to the control circuit 20 through a signal line 26a.

The registered information is entered to the transmission speed dependent ECM registration circuit 10, the destination/transmission speed dependent ECM registration circuit 12, the selection information registration circuit 18 and the initial transmission speed registration circuit 26 from a console unit 14. The console unit 14 comprises registration keys to register information to the respective circuits, one-touch dialing keys, abbreviation dialing keys, a ten-key and function keys to register. A key input signal generated by the depression of the key is outputted to the control circuit 20 through a signal line 14a.

Figure 2:
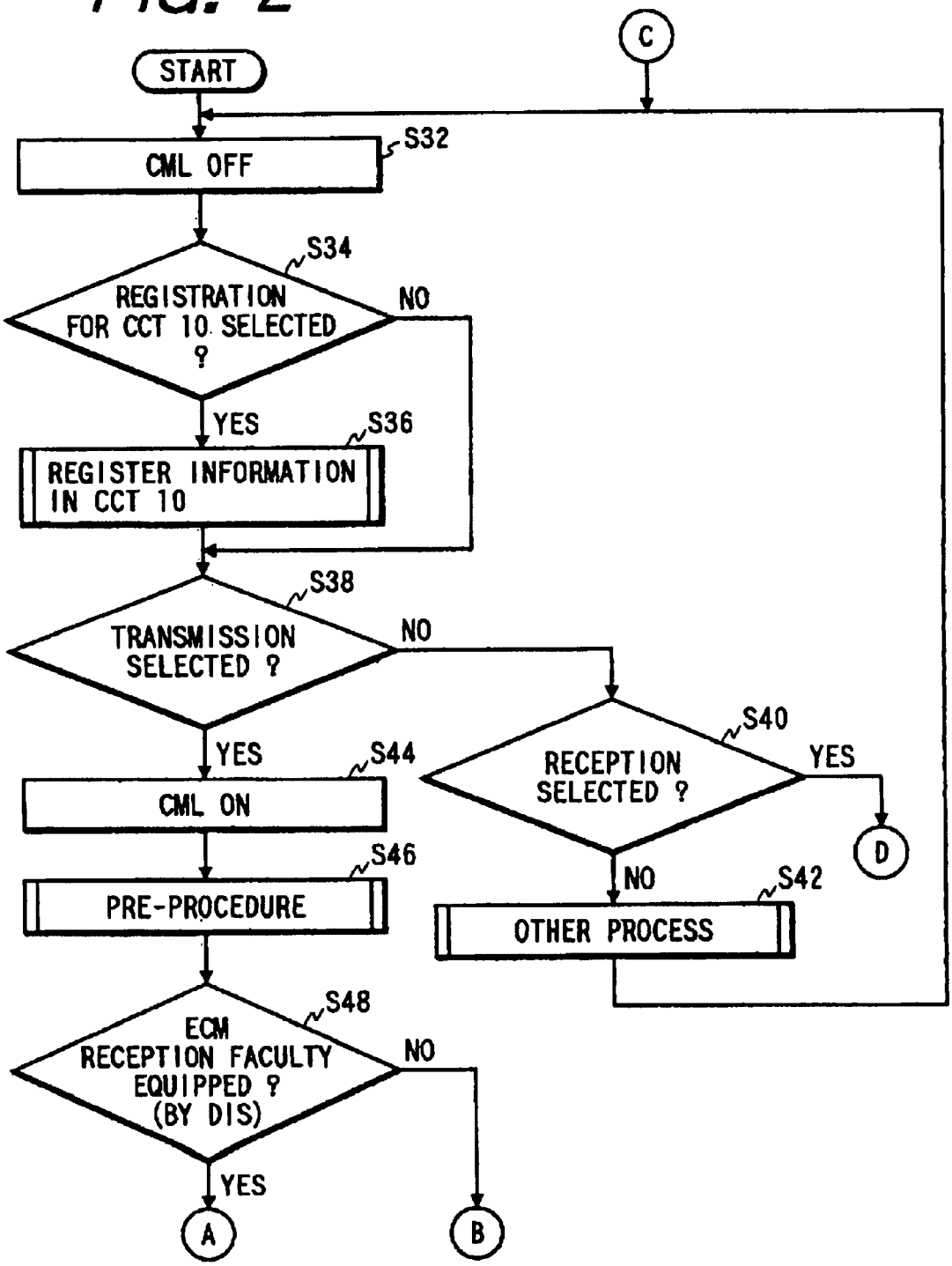
FIG. 2 shows a flow chart of a control operation by a control circuit of the facsimile apparatus of FIG. 1.
Figure 3:
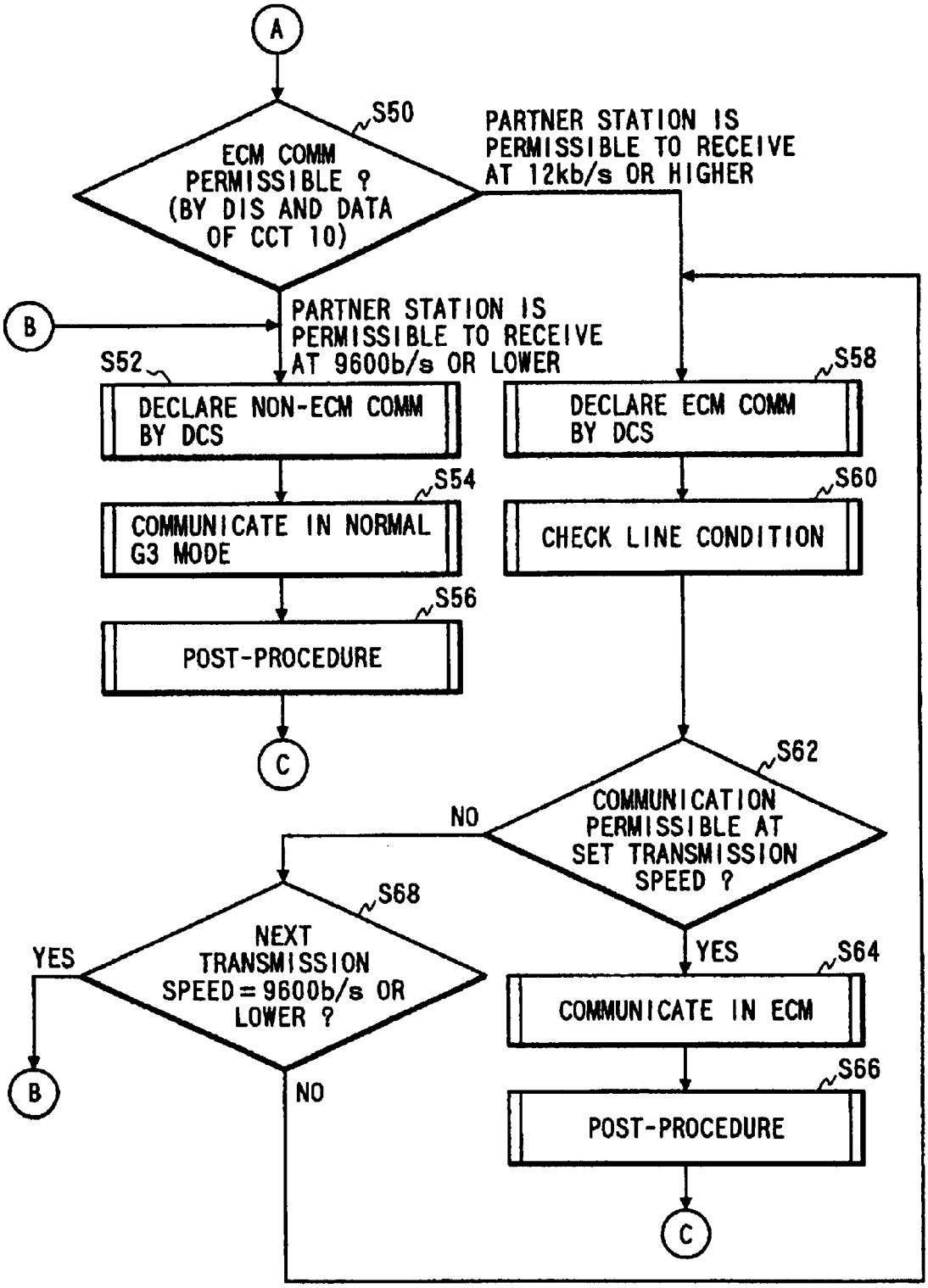
FIG. 3 shows a flow chart of a control operation by the control circuit of the facsimile apparatus of FIG. 1.
Figure 4:
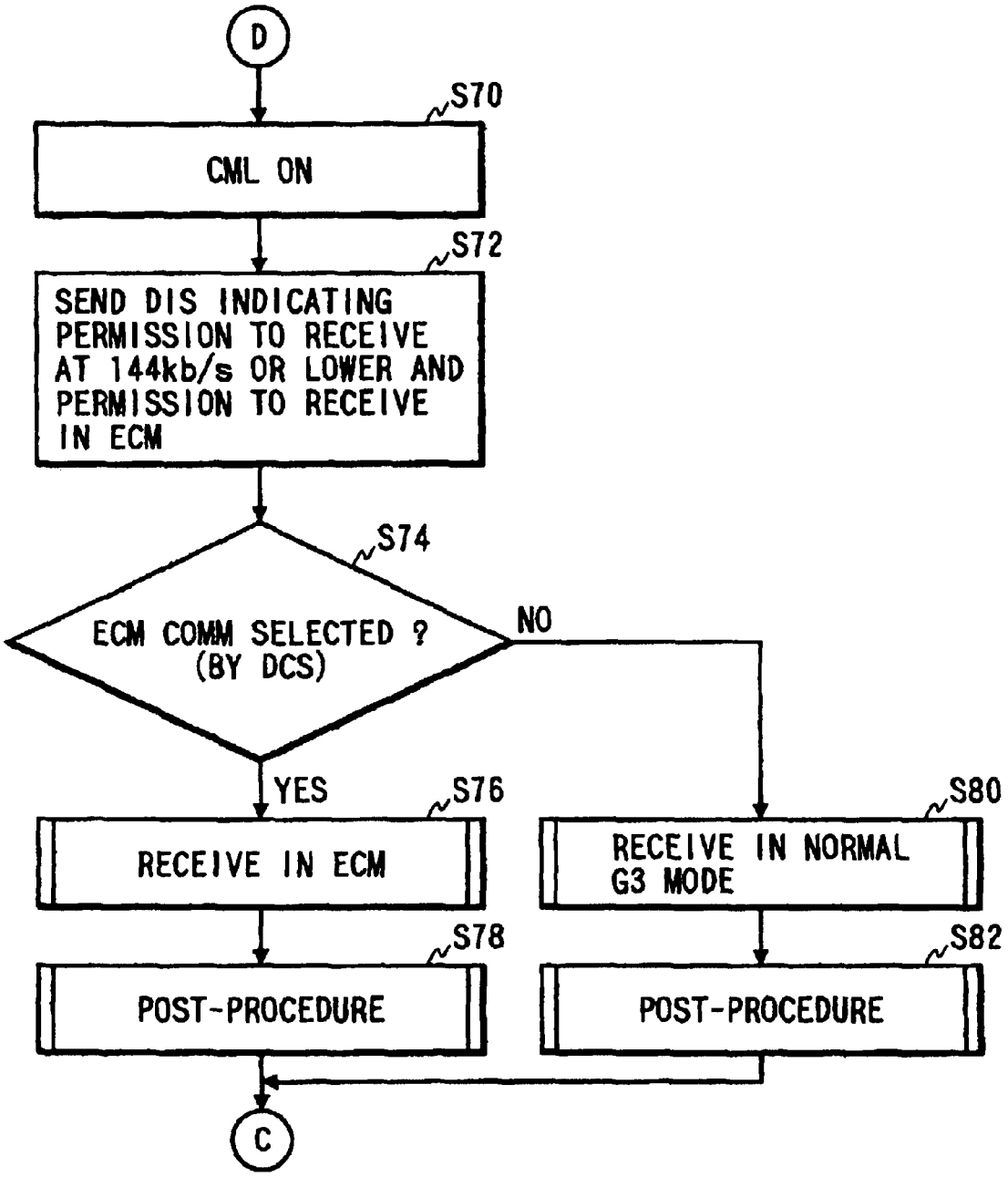
FIG. 4 shows a flow chart of a control operation by the control circuit of the facsimile apparatus of FIG. 1.

Referring to FIGS. 2 to 4, a control operation of the control circuit 20 is explained. FIGS. 2 to 4 show flow charts of the control operation by the control circuit of the facsimile apparatus of FIG. 1. In the present embodiment, it is assumed that the transmission speed of up to 14.4 Kb/s is permitted.

Referring to FIG. 2, a step S32 is first executed. In the step S32, a signal of level '0' is outputted to the signal line 20a to turn off the CML.

Then, a step S34 is executed. In the step S34, whether the registration to the transmission speed dependent ECM registration circuit 10 has been selected or not is determined. If the registration to the transmission speed dependent ECM registration circuit 10 has been selected, a step S36 is executed, and if the registration to the transmission speed dependent ECM registration circuit 10 has not been selected, a step S38 is executed.

In the step S36, the registration to the transmission speed dependent ECM registration circuit 10 is executed. For example, information indicating the execution of the ECM for the transmission speeds of 14.4 Kb/s and 12 Kb/s and information of inhibiting the execution of the ECM for the transmission speeds of 9.6 Kb/s, 7.2 Kb/s, 4.8 Kb/s and 2.4 Kb/s are registered.

Then, the step S38 is executed. In the step S38, whether the transmission has been selected or not is determined. If the transmission has not been selected, a step S40 is executed and if the transmission has been selected, a step S44 is executed.

In the step S40, whether the reception has been selected or not is determined. If the reception has been selected, a step S42 is executed, and if the reception has not been selected, a step S70 (shown in FIG. 4) is executed.

In the step S42, another process is executed and after the execution of the other process, the process returns to the step S32.

In the step S44, a signal of level '1' is outputted to the signal line 20a to turn on the CML.

After the execution of the step S44, a step S46 is executed. In the step S46, a pre-protocol is executed.

Then, a step S48 is executed. In the step S48, whether a destination station has an ECM reception function or not is determined based on a DIS (digital identification signal) from the designation station received during the pre-protocol. If the destination station has the ECM reception function, a step S50 (shown in FIG. 3) is executed, and when the destination station does not have the ECM reception function, a step S53 (shown in FIG. 3) is executed.

In the step S50, as shown in FIG. 3, whether the ECM communication is to be conducted or not is determined based on the permitted transmission speed (permitted reception speed) indicated by the DIS and the registered information in the transmission speed dependent ECM registration circuit 10. In the present embodiment, it is determined that the ECM communication is not conducted if the destination station is permitted to receive at the transmission speed of 9600 b/s or lower, and the ECM communication is conducted if the destination station is permitted to receive at the transmission speed of 12 Kb/s or higher.

When the non-execution of the ECM is determined, a step S52 is executed. In the step S52, the non-execution of the ECM communication is declared to the destination station by a DCS signal.

Then, a step S54 is executed to conduct the communication by the normal G3 mode. After the execution of the step S54, a step S56 is executed. In the step S56, a post protocol is executed and after the execution of the post protocol, the process returns to the step S32 (shown in FIG. 2).

On the other hand, when the execution of the ECM is determined (step S50), a step S58 is executed. In the step S58, the execution of the ECM communication is declared to the destination station by the DCS signal.

Then, a step S60 is executed. In the step S60, a line condition is checked.

After the line condition has been checked, a step S62 is executed. In the step S62, whether the communication at the transmission speed of 12 Kb/s or higher is permitted or not is determined based on the result of the check of the line condition. If the communication at 12 Kb/s or higher is permitted, a step S64 is executed, and if the communication at the transmission speed of 12 Kb/s or higher is not permitted, a step S68 is executed.

In the step S64, the communication with the ECM added is conducted. Then, a step S66 is executed. In the step S66, the post protocol is executed and after the execution of the post protocol, the process returns to the step S32 (shown in FIG. 2).

In a step S68, since it has been determined that the communication at the following transmission speed of 12 Kb/s or higher is not permitted, whether the transmission speed is to be set to 9600 b/s or lower or not is determined. If the following transmission speed is not to be set to 9600 b/s or lower, the process is repeated again from the step S58. If the following transmission speed is to be set to 9600 b/s or lower, the process shifts to the step S52. As the process is shifted to the step S58, whether the ECM communication is permitted or not is determined again based on the actual initial transmission speed and the registered information in the transmission speed dependent ECM registration circuit 10.

When the reception is selected in the step S40 (shown in FIG. 2), a step S70 is executed as shown in FIG. 4. In the step S70, a signal of level '1' is outputted to the signal line 20a to turn on the CML.

Then, a step S72 is executed. In the step S72, the DIS indicating that the reception at the transmission speed of 14.4 Kb/s or lower is permitted and the reception of the ECM is permitted is sent to the destination station.

After the DIS has been sent, a step S74 is executed. In the step S74, the DCS is received to determine whether the ECM communication has been designated or not. If the ECM communication has been designated, a step S76 is executed and if the ECM communication has not been designated, a step S80 is executed.

In the step S76, the reception with the ECM added is conducted. Then, a step S78 is executed. In the step S78, the post protocol is executed and after the execution of the post protocol, the process returns again to the step S32 (shown in FIG. 2).

In the step S80, the communication in the normal G3 mode is conducted without regard to the transmission speed and then a step S82 is conducted. In the reception mode, whether the ECM communication is to be conducted or not is determined based on the initial reception speed and the registered information of the transmission speed dependent ECM registration circuit 10. This determination does not use the actual reception speed.

In this manner, the fully effective utilization of the specific communication function in accordance with the transmission speed is attained.

[Second Embodiment]

Figure 5:
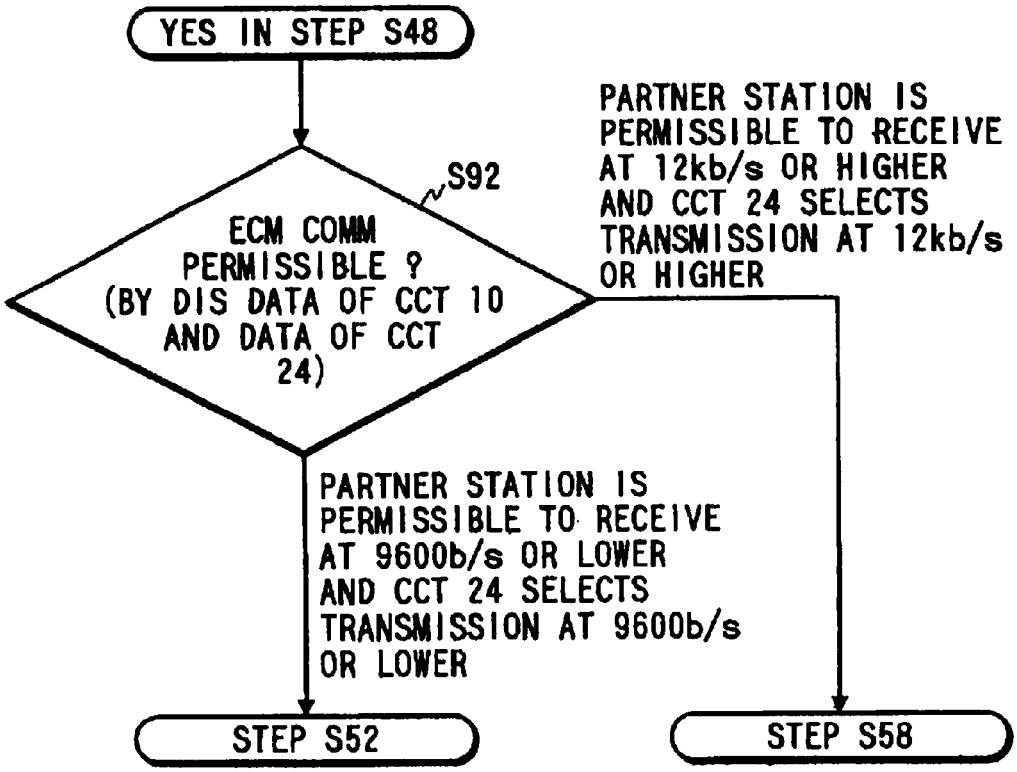
FIG. 5 shows a flow chart of a control operation by a control circuit in a second embodiment of the facsimile apparatus of the present invention.
Figure 6:
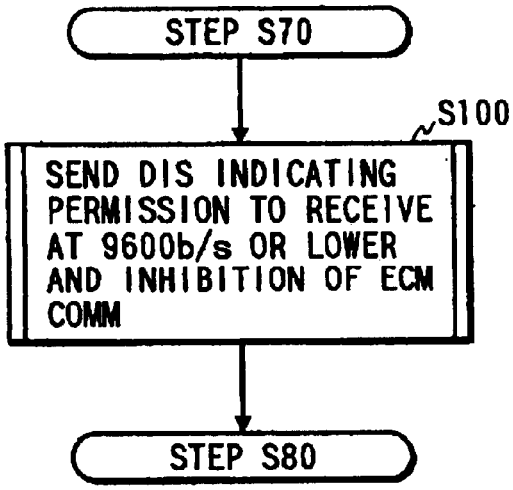
FIG. 6 shows a flow chart of a control operation by the control circuit in the second embodiment of the facsimile apparatus of the present invention.

Referring to FIGS. 5 and 6, a second embodiment of the present invention is explained. FIGS. 5 and 6 show flow charts of control operations of a control circuit in the second embodiment of the facsimile apparatus of the present invention. The like steps to those of the first embodiment are designated by the like numerals.

The present embodiment has the same configuration as that of the first embodiment and in the present embodiment, the initial transmission speed and the initial reception speed are set by the initial transmission speed setting circuit 24 and the initial reception speed setting circuit 22, respectively. For example, when the initial reception speed is set to 9600 b/s or lower, the control in the transmission mode is same as that in the first embodiment, but in the reception mode, the non-permission of the ECM reception is declared at the beginning.

Referring to FIGS. 5 and 6, a specific example of control is explained.

When the transmission is selected and the presence of the ECM reception function is determined in the step S48 (shown in FIG. 2), a step S92 is executed as shown in FIG. 5. In the step S92, whether the ECM communication is to be conducted or not is determined based on the permitted reception speeds indicated by the DIS, the registered information in the transmission speed dependent ECM registration circuit 10 and the setting speed in the initial transmission speed setting circuit 24. In the present embodiment, when the destination station is permitted to receive at the transmission speed of 9600 b/s or lower or when the transmission speed of 9600 b/s or lower is set by the initial transmission speed setting circuit 24, it is determined that the ECM communication is not conducted. If the destination station is permitted to receive at the speed of 12 Kb/s or higher and the speed of 12 Kb/s or higher is set by the initial transmission speed setting circuit 24, it is determined that the ECM communication is conducted.

When the non-execution of the ECM communication is made, the step S52 (shown in FIG. 3) is executed. On the other hand, if the execution of the ECM communication is determined, the step S58 (shown in FIG. 3) is executed. Namely, the ECM communication is attempted.

When the reception is selected, the step S70 (shown in FIG. 4) and a step S100 are sequentially executed as shown in FIG. 6. In the step S100, a DIS signal indicating the permission of reception at the speed of 9600 b/s or lower and the non-permission of the ECM communication is sent. Then, the step S80 (shown in FIG. 4) is executed. Namely, the communication by the normal G3 mode is conducted.

[Third Embodiment]

Figure 7:
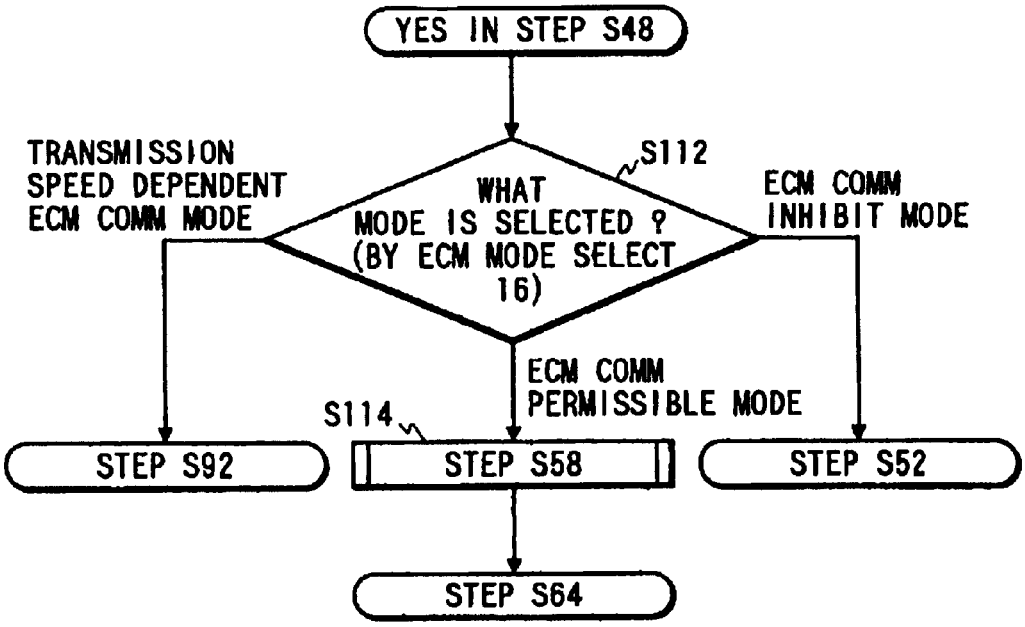
FIG. 7 shows a flow chart of a control operation by a control circuit in a third embodiment of the facsimile apparatus of the present invention.
Figure 8:
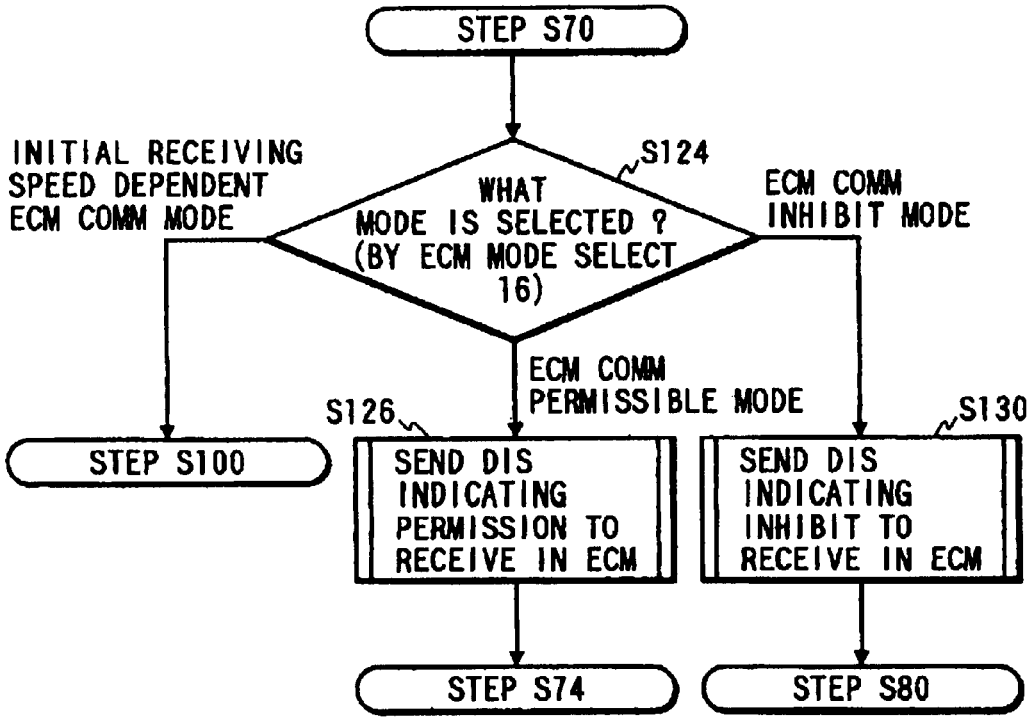
FIG. 8 shows a flow chart of a control operation by the control circuit in the third embodiment of the facsimile apparatus of the present invention.

Referring to FIGS. 7 and 8, a third embodiment of the present invention is explained. FIGS. 7 and 8 show flow charts of a control operation of the control circuit in the third embodiment of the facsimile apparatus of the present invention. In the figures, the like steps to those of the first and second embodiments are designated by the like numerals.

The present embodiment has the same configuration as that of the first embodiment. In the present embodiment, one of the three modes, a mode to determine whether the ECM communication is to be conducted or not for the respective permitted transmission speeds based on the registered information in the transmission speed dependent ECM registration circuit 10, a mode to conduct the ECM communication for the respective permitted transmission speeds and a mode to conduct the normal communication without the ECM added for the respective permitted transmission speeds is selected by the ECM mode selection switch 16 and the communication is conducted in the selected mode.

Referring to FIGS. 7 and 8, the control is explained specifically.

When the transmission is selected and the presence of the ECM reception function is determined in the step S48 (shown in FIG. 2), a step S112 is executed as shown in FIG. 7. In the step S112, which mode has been selected by the input operation by the ECM mode selection switch 16 is determined.

When the mode to determine whether the ECM communication is to be conducted or not for the respective permitted transmission speeds based on the registered information in the transmission speed dependent ECM registration circuit 10 is selected, the step S92 (shown in FIG. 5) is executed.

When the mode to conduct the ECM communication for the respective permitted transmission speeds is selected, a step S114 is executed. In the step S114, the execution of the ECM communication is declared by the DCS as it is in the step S58 (shown in FIG. 3).

When the normal mode without the ECM added for the respective permitted transmission speeds is selected, namely when the ECM communication inhibition is selected, the step S52 (shown in FIG. 3) is executed.

When the reception is selected, the step S70 (shown in FIG. 4) and a step S124 are executed sequentially. In the step S124, which mode has been selected by the input operation by the ECM mode selection switch 16 is determined.

When the mode to determine whether the ECM communication is to be conducted or not for the respective permitted transmission speeds based on the registered information in the transmission speed dependent ECM registration circuit 10 is selected, namely when the execution of the ECM communication at the initial reception speed is selected, the step S100 (shown in FIG. 6) is executed.

When the mode to conduct the ECM communication for the respective permitted transmission speed is selected, a step S126 is executed. In the step S126, the DIS signal indicating the permission of the ECM reception is sent to the destination station. Then, the step S74 (shown in FIG. 4) is executed.

When the normal communication mode without the ECM added for the respective permitted transmission speeds is selected, namely when the ECM communication inhibition is selected, a step S130 is executed. In the step S130, the DIS signal indicating the non-permission of the ECM reception is sent to the destination station. Then, the step S80 (shown in FIG. 4) is executed.

In this manner, the range in which the communication with the ECM added or the communication without the ECM added is selected in accordance with the permitted transmission speed can be expanded.

[Fourth Embodiment]

Figure 9:
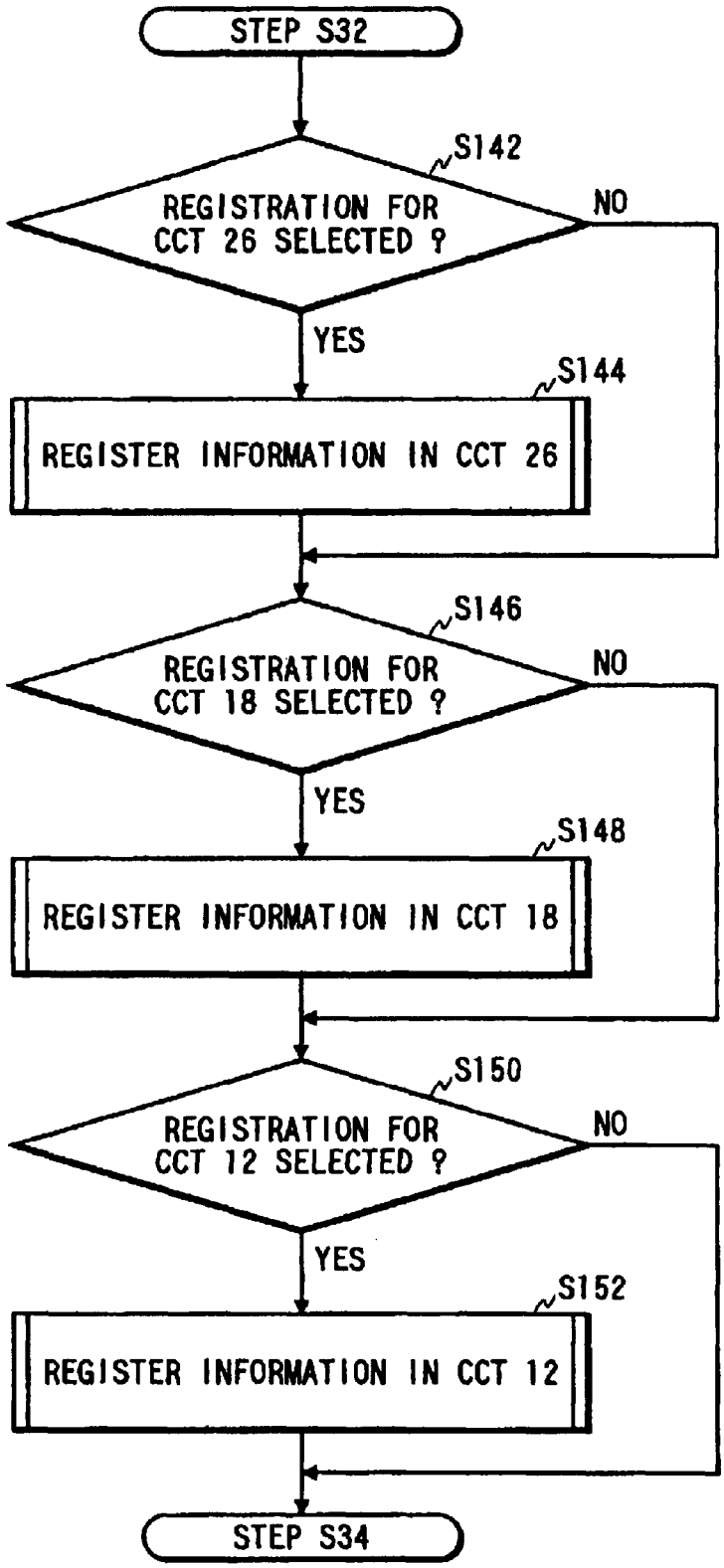
FIG. 9 shows a flow chart of a control operation by a control circuit in a fourth embodiment of the facsimile apparatus of the present invention.
Figure 10:
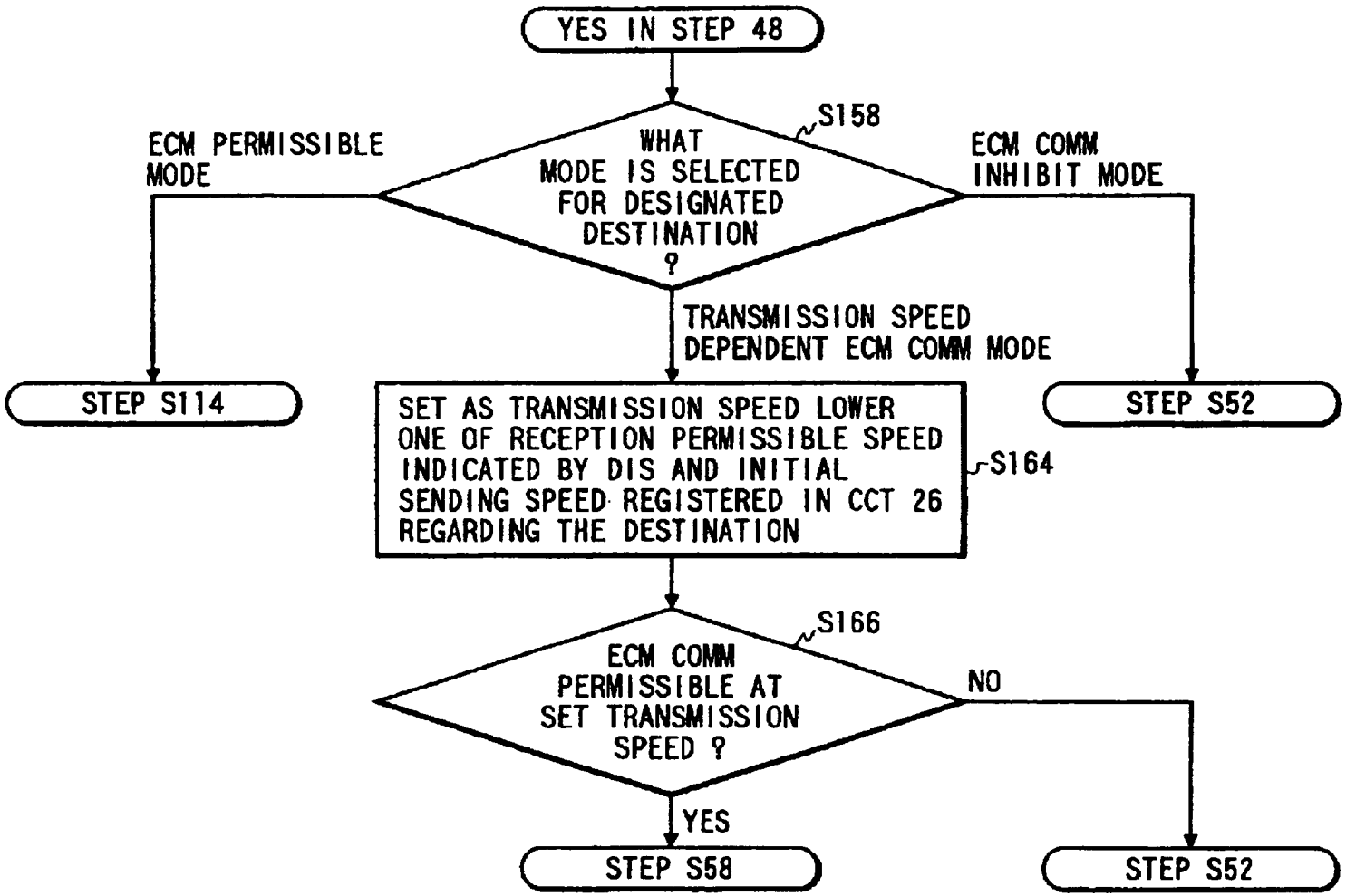
FIG. 10 shows a flow chart of a control operation by the control circuit in the fourth embodiment of the facsimile apparatus of the present invention.
Figure 11:
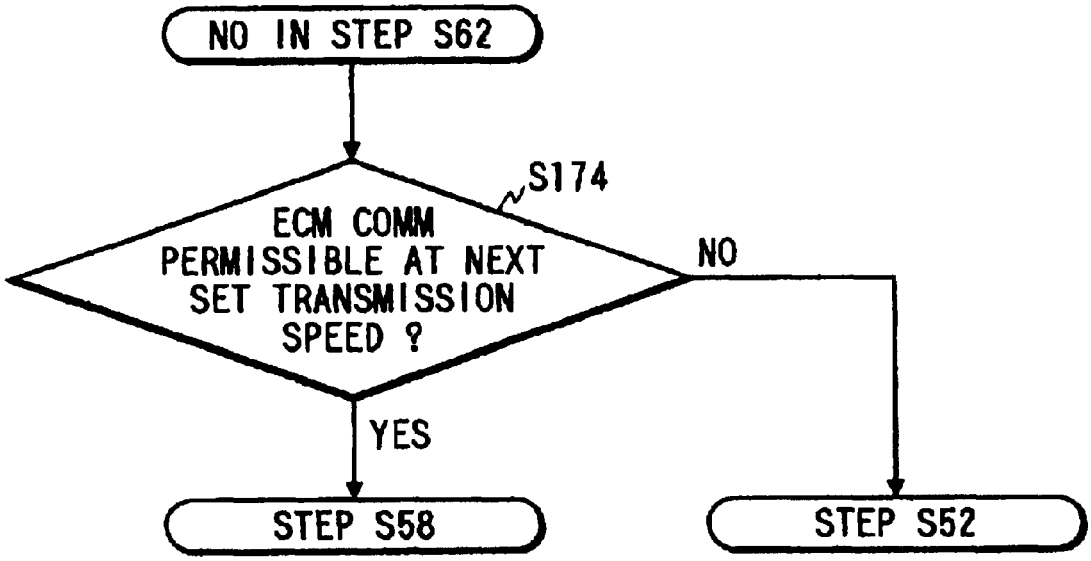
FIG. 11 shows a flow chart of a control operation by the control circuit in the fourth embodiment of the facsimile apparatus of the present invention.

Referring to FIGS. 9 to 11, a fourth embodiment of the present invention is explained.

FIGS. 9 to 11 show flow charts of a control operation by the control circuit in the fourth embodiment of the facsimile apparatus of the present invention. In the figures, the like steps to those in the first, second and third embodiments are designated by the like numerals.

The present embodiment has the same configuration as that of the first embodiment. In the present embodiment, one of the three modes, a mode to determine whether the ECM communication is to be conducted or not for the respective permitted transmission speeds based on the initial transmission speed registered in the initial transmission speed registration circuit 26 in association with the destination stations and the registered information in the destination/transmission speed dependent ECM registration circuit 12, a mode to conduct the ECM communication for the respective permitted transmission speeds and a mode to conduct the normal communication without the ECM added for the respective permitted transmission speeds is selected by the selection information registration circuit 18 and the communication control in the transmission mode is conducted in accordance with the selected mode.

Referring to FIGS. 9 to 11, the control is explained specifically.

When the CML is turned on in the step S32 (shown in FIG. 2), a step S142 is executed as shown in FIG. 9. In the step S142, whether the registration to the initial transmission speed registration circuit 26 has been selected or not is determined based on the input information from the console unit 14. If the registration to the initial transmission speed registration circuit 26 is selected, a step S144 is executed and if the registration to the initial transmission speed registration circuit 26 is not selected, a step S146 is executed.

In the step S144, the initial transmission speeds are registered in the initial transmission speed registration circuit 26 in association with the destination stations.

Then, a step S146 is executed. In the step S146, whether the registration to the selected information registration circuit 18 has been selected or not is determined based on the input information from the console unit 14. If the registration to the selected information registration circuit 18 is selected, a step S148 is executed and if the registration to the selected information registration circuit 18 is not selected, a step S150 is executed.

In the step S148, the information for setting the inhibition of the ECM communication associated with the destination station, the information for setting the validity of the ECM communication associated with the destination station and the information for setting the execution or non-execution of the ECM communication associated with the transmission speed for each destination are registered in the selected information registration circuit 18.

Then, a step S150 is executed. In the step S150, whether the registration to the destination/transmission speed dependent ECM registration circuit 12 has been selected or not is determined based on the input information from the console unit 14. When the destination/transmission speed dependent ECM registration circuit 12 is selected, a step S152 is executed and if the registration to the destination/transmission speed dependent ECM registration circuit 12 is not selected, the step S34 (shown in FIG. 2) is executed.

In the step S152, the information indicating the execution or non-execution of the ECM communication corresponding to the destination and the transmission speed is registered in the destination/transmission speed dependent ECM registration circuit 12.

Then, the step S34 (shown in FIG. 2) is executed.

When the transmission is selected and the presence of the ECM reception function is determined in the step S48 (shown in FIG. 2), a step S158 is executed as shown in FIG. 10. In the step S158, the registered information in the destination/transmission speed dependent ECM registration circuit 12 is inputted to determine the mode to the set destination station. If the ECM communication is valid for the destination station, the step S114 (shown in FIG. 7) is executed and if the ECM communication is inhibited for the destination station, the step S52 (shown in FIG. 3) is executed, and when the execution or non-execution of the ECM communication is determined for the destination station based on the transmission speed, a step S164 is executed.

In the step S164, a lower one of the two transmission speeds, the permitted reception speed indicated by the DIS and the initial transmission speed associated with the destination station in the initial transmission speed registration circuit 26 is set as the initial transmission speed.

Then, a step S166 is executed. In the step S166, whether the ECM communication at the set transmission speed is to be conducted or not is determined based on the information registered in the selected information registration circuit 18. For example, if the execution of the ECM communication is permitted for the set transmission speed, it is determined that the ECM communication is conducted at the set transmission speed, and if the execution of the ECM communication is inhibited for the set transmission speed, it is determined that the ECM communication is not conducted at the set transmission speed.

When it is determined that the ECM communication is conducted at the set transmission speed, the step S58 (shown in FIG. 3) is executed and if it is determined that the ECM communication is not conducted at the set transmission speed, the step S52 (shown in FIG. 3) is executed.

If it is determined that the communication at the transmission speed set in the step S62 is not permitted, a step S171 is executed as shown in FIG. 11. In the step S174, whether the ECM communication is to be conducted or not for the next set transmission speed based on the information in the selection information registration circuit 18 for the destination station. If it is determined that the ECM communication is conducted at the set transmission speed, the step S58 (shown in FIG. 3) is executed, and if it is determined that the ECM communication is not conducted at the set transmission speed, the step S52 (shown in FIG. 3) is executed.

In this manner, the range of selection of the communication with the ECM added or the communication without the ECM added in accordance with the destination and the permitted transmission speed can be expanded.

[Fifth Embodiment]

An embodiment for the transmission speeds of 28.8 Kb/s, 26.4 Kb/s, 24 Kb/s, 21.6 Kb/s, 19.2 Kb/s and 16.8 Kb/s is explained.

Those transmission speeds are ones of the V.34 Recommendation.

In the facsimile transmission by the V.34 Recommendation, the ECM is essential. Accordingly, when the ECM inhibition mode is selected by the ECM mode switch of FIG. 1, the transmission speeds of 28.8 Kb/s, 26.4 Kb/s, 24 Kb/s, 21.6 Kb/s, 19.2 Kb/s and 16.8 Kb/s which are the transmission speeds for the V.34 Recommendation are not selected.

Further, in the V.34 Recommendation, it is essential to follow the pre-protocol as defined by the V.8 Recommendation. Thus, when the execution of the ECM mode is selected, the V.8 Recommendation protocol is executed.

Figure 12:
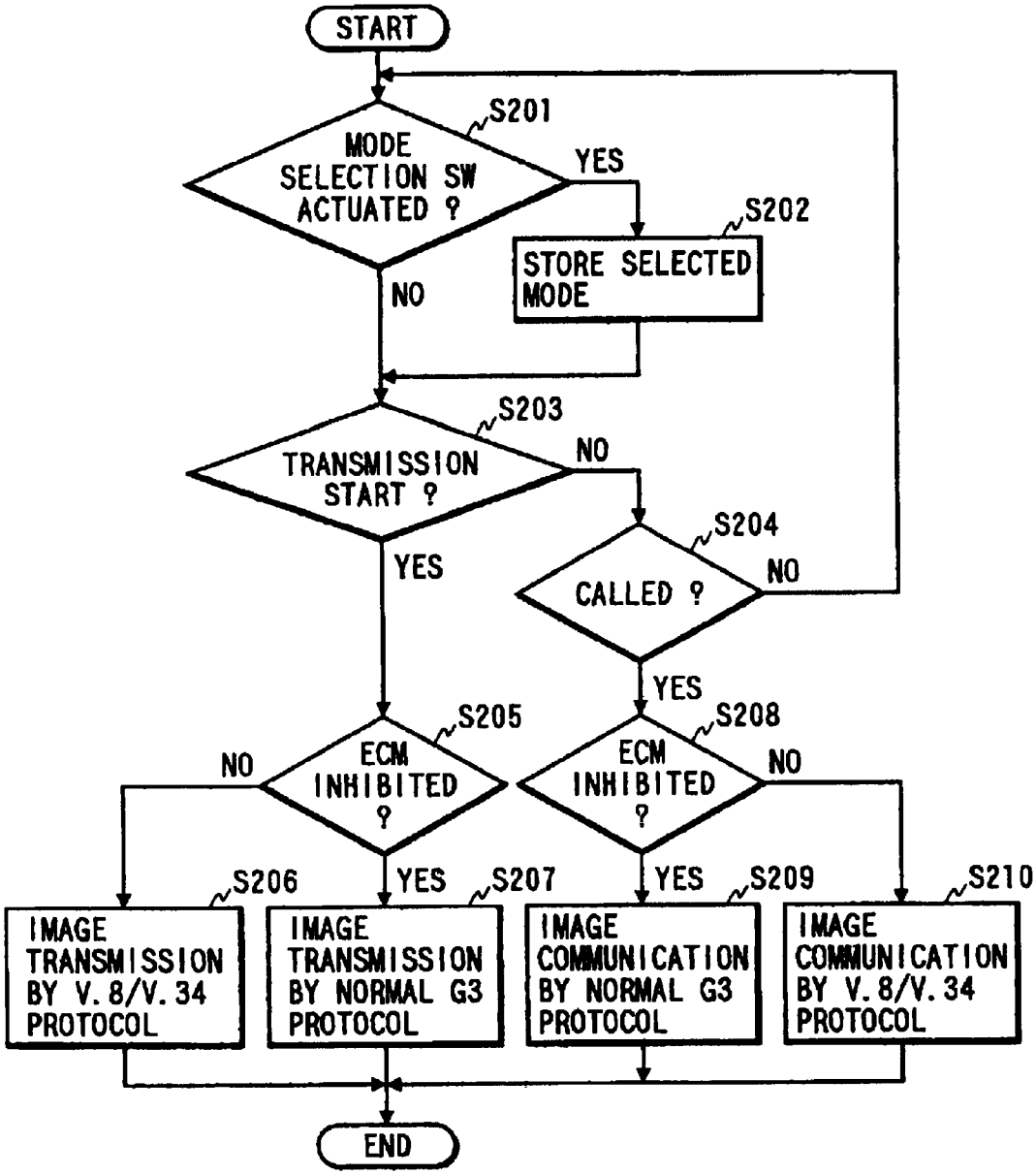
FIG. 12 shows a flow chart of a control operation by a control circuit in a fifth embodiment of the facsimile apparatus of the present invention.

A flow of the operation is shown in FIG. 12.

In a step S201, whether the mode selection switch has been operated or not is determined. If the ECM inhibition mode has been selected, the selection of the ECM inhibition mode is stored in an internal memory of the control circuit 20.

In a step S203, whether the transmission has been selected or not is determined, and in a step S204, whether a call has been received or not is determined.

If the transmission is selected in the step S203, whether the ECM is inhibited or not is determined in a step S205 by referring to the internal memory of the control circuit 20. If the ECM is inhibited, image data is transmitted in a step S207 by using the normal G3 protocol. On the other hand, if the ECM is not inhibited, the image is transmitted by using the V.8 and V.34 protocol.

If the reception of the call is detected in the step S204, whether the ECM is inhibited or not is determined in a step S208 by referring to the internal memory of the control circuit 20. If the ECM is inhibited, the image is received in a step S209 by using the normal G3 protocol. On the other hand, if the ECM is not inhibited, the image is received by using the V.8 and V.34 protocol.

What is claimed is:

1. A facsimile apparatus for executing image communication in an error correction mode comprising:

selection means for selecting the execution or non-execution of the error correction mode;

communication means having a first communication protocol *for which the error correction mode is* essential [for the communication in the error correction mode] and a second communication protocol *for which the error correction mode is* not essential [in the error correction mode]; and control means for inhibiting the communication by said first communication protocol and conducting the communication by said second communication protocol in response to the selection of the [inhibition] *non-execution* of the error correction mode by said selection means.

2. A facsimile apparatus according to claim 1, further comprising:

detection means for detecting a communication protocol available to a destination station;

wherein said control means selects one of the first communication protocol and the second communication protocol for communication in response to the detection of availability of both of the first communication protocol and the second communication protocol in the destination station by said detection means and the selection [to permit] *of the execution of* the error correction mode by said selection means.

3. A facsimile apparatus having an error correction mode added, comprising:

first registration means for registering information indicating the execution or non-execution of the error correction mode in association with a modulation method; and control means for controlling communication based on the information of said first registration means such that communication is executed in the error correction mode when a communication speed is high and communication is executed in a mode other than the error correction mode when the communication speed is low.

4. A facsimile apparatus having an error communication mode added, comprising:

first registration means for registering information indicating the execution or non-execution of the error correction mode in association with each permitted transmission speed; and control means for controlling communication based on the information of said first registration means, wherein said first registration means contains information for permitting the execution of the error correction mode for the transmission speeds of 14.4 Kb/s and 12 Kb/s and information to inhibit the execution of the error correction mode for the transmission speeds of 9.6 Kb/s, 7.2 Kb/s, 4.8 Kb/s and 2.4 Kb/s.

5. A facsimile apparatus according to claim 4, further comprising:

second registration means for registering information for permitting the execution of the error correction mode for respective permitted transmission speeds and information for inhibiting the execution of the error correction mode for the respective permitted transmission speeds, said control means controlling communication based on the information of said first registration means and the information of said second registration means.

6. A facsimile apparatus having an error correction mode added, comprising:

first registration means for registering information indicating the execution or non-execution of the error correction mode in association with each permitted transmission speed;

second registration means for registering information indicating the execution or non-execution of the error correction mode in association with each destination station and each transmission speed; and control means for controlling communication based on one of the information of said first registration means and the information of said second registration means, wherein said second registration means contains permission information for permitting the execution of the error correction mode for the transmission speeds of 14.4 Kb/s and 12 Kb/s for each destination station and information for inhibiting the execution of the error correction mode for respective permitted transmission speeds of 9.6 Kb/s, 7.2 Kb/s, 4.8 Kb/s and 2.4 Kb/s.

7. A facsimile apparatus according to claim 6, further comprising:

third registration means for registering third information for permitting the execution of the error correction mode for the respective permitted transmission speeds for each destination station and information to inhibit the execution of the error correction mode for the respective permitted transmission speeds, said control means controlling communication based on the information of said second registration means and the information of said third registration means.

* * * * *